United States Patent [19]

Hartwig

[11] 4,451,872
[45] May 29, 1984

[54] PROCESS FOR THE MOST UNIFORM ILLUMINATION OF A SURFACE BY A COLLIMATED BEAM OF RAYS AND ARRANGEMENT FOR LASER DIAGNOSTIC

[75] Inventor: Heinz Hartwig, Niederzier, Fed. Rep. of Germany

[73] Assignee: Kernforschungsanlage Jülich Gesellschaft mit beschränkter Haftung, Jülich, Fed. Rep. of Germany

[21] Appl. No.: 324,544

[22] Filed: Nov. 24, 1981

[30] Foreign Application Priority Data

Nov. 26, 1980 [DE] Fed. Rep. of Germany ....... 3044470

[51] Int. Cl.³ .............................................. F21V 5/02
[52] U.S. Cl. .................................. 362/251; 362/311; 362/337; 362/330; 362/340; 362/332; 362/335; 350/286; 350/432
[58] Field of Search ............... 362/259, 335, 330, 332, 362/311, 337, 339, 340; 350/170, 413, 432, 286

[56] References Cited

U.S. PATENT DOCUMENTS

| 3,541,323 | 11/1970 | Stewart et al. | 362/259 |
| 3,620,600 | 11/1971 | Lindberg . | |
| 3,710,098 | 1/1973 | Walden | 362/259 X |
| 3,716,709 | 2/1973 | Tahavull | 362/330 |
| 3,763,369 | 10/1973 | Lewin | 362/330 X |
| 3,794,829 | 2/1974 | Tahavull | 362/330 |
| 3,919,543 | 11/1975 | Noren | 362/290 X |
| 4,185,891 | 1/1980 | Kaestner | 362/259 X |
| 4,253,735 | 3/1981 | Kawamura et al. | 362/259 X |
| 4,358,816 | 11/1982 | Soileau | 362/348 X |

FOREIGN PATENT DOCUMENTS 2608176 9/1977 Fed. Rep. of Germany .
2817129 9/1979 Fed. Rep. of Germany .

OTHER PUBLICATIONS

"Das Mikroskop und Seine Anwendung," Leitz-Wetzlar 1969, pp. 8-9.

Primary Examiner—Peter A. Nelson
Attorney, Agent, or Firm—Scully, Scott, Murphy & Presser

[57] ABSTRACT

A process for the most uniformly possible illumination of a surface by a collimated beam of rays with arbitrary distribution of the beam intensities.

An equalization in intensity is achieved in a plane perpendicular to the direction of the beam in that, in the parallel beam path extending perpendicular to the beam direction a generally planoconvex beveled or faceted lens with congruent square or hexagonal surface elements is interposed at a distance from the surface which is to be illuminated corresponding to the focusing distance.

4 Claims, 7 Drawing Figures

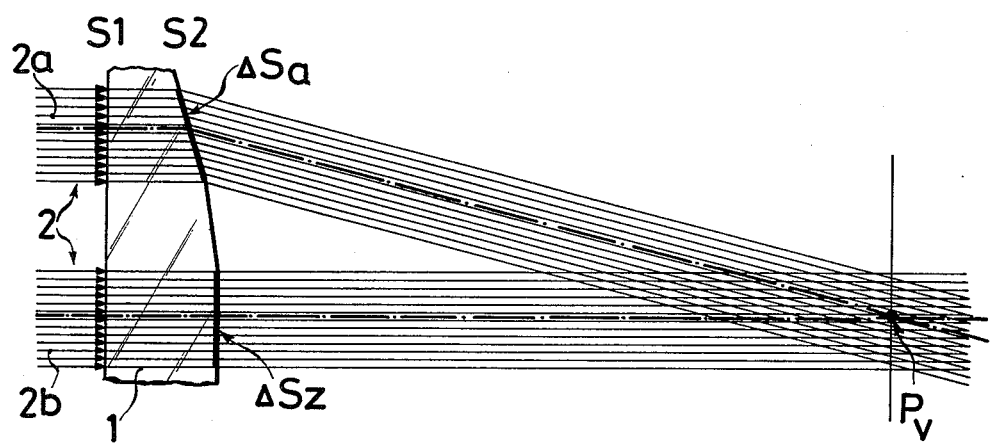
FIG.1
FIG.2
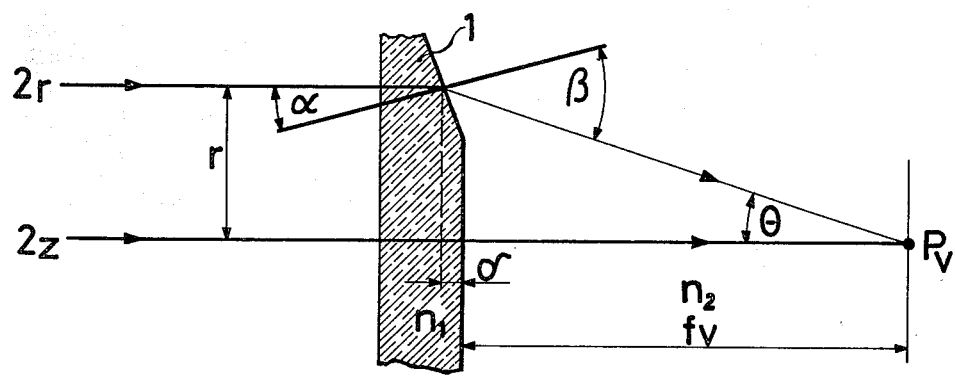

PROCESS FOR THE MOST UNIFORM ILLUMINATION OF A SURFACE BY A COLLIMATED BEAM OF RAYS AND ARRANGEMENT FOR LASER DIAGNOSTIC

BACKGROUND OF THE INVENTION

1. Field of the Invention

The present invention relates to a process for the most uniformly possible illumination of a surface by a collimated beam of rays with suitable distribution of the beam intensities.

2. Discussion of the Prior Art

A uniform illumination of a surface by a collimated beam of rays is of significance in the quantitative examination of optical interactions such as, for example, in the laser diagnostic. Frequently, however, a uniform intensity distribution, particularly in the case of a laser beam, can be achieved only with extremely high losses in the overall intensity due to the cutting off of the marginal rays. Moreover, in this instance the overall intensity is often reproduceable, but not the intensity distribution, so that also the cutting off of the marginal rays will not lead with any assurance to the desired result.

SUMMARY OF THE INVENTION

Pursuant to the invention there is achieved an equalization in intensity in a plane perpendicular to the direction of the beam in that, in the parallel beam path extending perpendicular to the beam direction a generally planoconvex beveled or faceted lens with congruent square or hexagonal surface elements is interposed at a distance from the surface which is to be illuminated corresponding to the focusing distance.

With the aid of such a faceted lens, from a beam of collimated rays, with arbitrary distribution of the beam intensities through superposition of the partial beams of equal cross-sections dispersed on the individual surface elements at a predetermined distance from the faceted lens; the focusing distance, there can be achieved a substantially uniform distribution of the intensity.

BRIEF DESCRIPTION OF THE DRAWINGS

The function of such a faceted lens is now described in detail hereinbelow, taken in conjunction with the accompanying drawings; in which:

FIGS. 1 and 2 illustrate the general beam path through a faceted lens;

DETAILED DESCRIPTION

Figure 3:
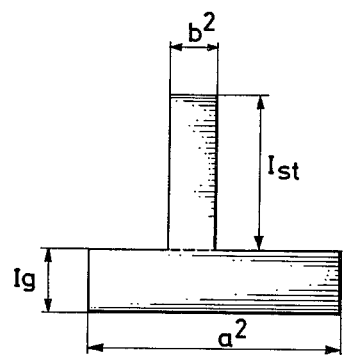
FIGS. 3 and 4 illustrate models for the assumed intensity distributions in the incident beam.

The schematic sketch pursuant to FIG. 1 which is employed for illustrating the function of the invention, discloses a sectional view through a portion of a faceted lens 1 whose planar surface s1 is arranged perpendicular to the beam of rays 2 and is impinged upon opposite to the surface elements ΔSa and ΔSz of the by partial beams 2a and 2b. The plane or flat surface elements ΔS of the surface S2 are congruent to each other and their surface normals are so oriented that the beams which pass through the centroid of the surface, will intersect the central beam at a point Pv.

The configuration of the central surface element $\Delta S_z$ herein determines the cross-section of a partial beam and the cross-section of the total beam in the normal plane at the focal distance. The same is valid at a small inclination of the surface normals relative to the axis (large focal distance and small aperture) with sufficient precision also for all other surface elements ΔS.

In the normal plane extending through the focal point Pv there are superimposed the individual partial beams, wherein there is achieved an extensive equalization of the intensity deviations within the total beam.

The angle of inclination α of the facets with respect to the central facet can be calculated as follows:

As can be ascertained from the sketch in FIG. 2, a middle point beam $2_z$ of the central facet and a middle point beam $2_r$ of an axially offset facet will meet at focal point $p_v$ after traversing the faceted lens. The spacing between the middle point beams $2_z$ and $2_r$ is r. The distance of the faceted lens from the focal point is designated $f_v$ (focal distance).

From the law of refraction there follows:

$$(n_1 n_2) \sin \alpha = \sin \beta \qquad (1)$$

Furthermore, the relationships are effective $$tg\theta = \frac{r}{f_v + \delta} \qquad (2)$$

and $$\theta = \beta - \alpha \qquad (3)$$

Since we are only interested in "thin" lenses ($f_v \gg r$) we can introduce the approximation of Gauss' optic theory:

$$\sin \alpha \approx \alpha; \; \sin \beta \approx \beta; \; tg\theta \approx \theta; \; \delta \approx 0$$

When we set $(n_1/n_2) = n$, then we obtained from (1):

$$n\alpha = \beta \qquad (4)$$

and from (2):

$$r = f_v \times \theta \qquad (5)$$

Insertion of (3) and (4) provides:

$$r = f_v \alpha (n-1) \qquad (6)$$

From this there finally follows:

$$\alpha = r \cdot \frac{1}{f_v} \cdot \left( \frac{1}{n-1} \right) \qquad (7)$$

In effect, the angle α is proportional to the spacing r of the middle point beams of adjacent facets and inversely proportional to the focal distance.

Figure 4:
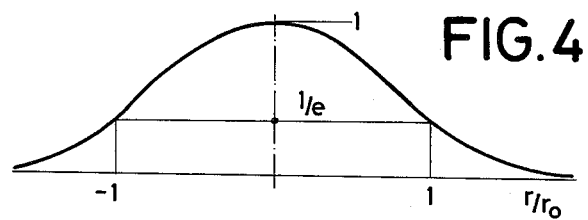
Figure 5:
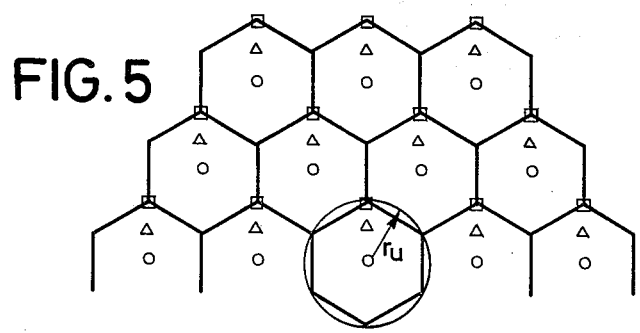
FIG. 5 illustrates the adjoining surface elements of a faceted lens with hexagonal facets.

The adaptation of the facet sizes to the beam dimensions depends upon the desired intensity equalization and the original intensity distribution of the impinging beam. For two typical cases of the intensity distribution, as is illustrated in FIGS. 3 and 4, the facet size can be calculated as follows:

CASE 1 (FIG. 3)

Illustrates a uniform distribution of the intensity with a superimposed disturbance, whereby the basic intensity $I_g$ being distributed across the surface of the total beam ($A_{ges}$) applied as $a^2$, and a disturbing intensity $I_{st}$ being spread across a surface area ($A_{st}$) assumed with $b^2$.

For the surface ratio we set $(A_{ges}/A_{st})=Z_1$, from which there follows:

$$A_{ges}=Z_1 A_{st} \quad (1)$$

For the intensity ratio we set $(I_{st}/I_g)=Z_2$, from which there follows:

$$I_{st}=Z_2 I_g \quad (2)$$

The number of facets is assumed to be n.
The total flux in the beam is $$\phi_{ges}=A_{ges} I_g + a_{st} I_{st},$$

or after the insertion of (1)

$$\phi_{ges}=A_{st}(Z_1 I_g + I_{st}) \quad (3)$$

When the superposition is effected through n facets, then for the facet surface there is obtained $$A_F=(Z_1/n)A_{st} \quad (4)$$

When there is assumed a quadratically faceted lens, in effect, a similarity between the facets and the beam cross-section, then for the medium intensity in the superimposed beam there is obtained $$\bar{I} = \frac{A_{st}(Z_1 I_g + I_{st})}{\frac{Z_1}{n} A_{st}} = n I_g + \frac{n}{Z_1} I_{st} \quad (5)$$

The maximum intensity Imax in the superimposed beam under the conditions $n < Z_1$ consists of $$I_{max}=nI_g+I_{st} \quad (6)$$

Through inserting of (2) in (5) and (6) we obtain $$\bar{I}=I_g(n+(n/Z_1)Z_2) \text{ and}$$

$$I_{max}=I_g(n+Z_2)$$

We form the dependent deviation $$\frac{I_{max}-\bar{I}}{\bar{I}} = \frac{\Delta I}{\bar{I}}$$

$$\frac{\Delta I}{\bar{I}} = \frac{\left(Z_2 - \frac{n}{Z_1} Z_2\right) I_g}{\left(n + \frac{n}{Z_1} Z_2\right) I_g}$$

and, finally, through reforming $$\frac{\Delta I}{\bar{I}} = \left(\frac{1}{n} - \frac{1}{Z_1}\right) \frac{Z_1 Z_2}{Z_1 + Z_2} \quad (7)$$

One recognizes from (7) that with an increasing facet number n the deviation becomes smaller and finally (for $n=Z_1$) becomes equal to zero (complete smoothing).

In the range of $Z_1 < n < 2Z_1$ the maximum intensity in the beam becomes $$I_{max}=nI_g+4I_{st}=I_g(n+4Z_2) \quad (8)$$

and deviation $$\frac{\Delta I}{\bar{I}} = \left(\frac{4}{n} - \frac{1}{Z_1}\right) \frac{Z_1 Z_2}{Z_1 + Z_2} \quad (9)$$

The comparison with (7) indicates that when n becomes only slightly greater than $Z_1$, the deviation will again suddenly increase to the value for (n/4) in the range $n < Z_1$. It is also urgently indicated that one should remain in the range $n < Z_1$, in effect, the surface area of a facet is to be selected somewhat larger than the surface area of a sudden disturbance.

CASE 2 (FIG. 4)

Here there is assumed a gauss distribution of the intensity in the beam of rays, whose intensity pattern is represented by the following equation:

$$I(r)=e^{-(r/r_o)^2}$$

whereby $r_o$ is the radius in which I (r) has dropped off to 1/e. Considered is a superposition through hexagonal facets, $r_u$ is the radius of the circumference of a facet. The center of the distribution is the middle perpendicular of the central facet. Examined are the summations $$I_o=\frac{\varepsilon}{n}i_o(r); \quad I_\Delta=\frac{\varepsilon}{n}i_\Delta(r); \quad I_\square=\frac{\varepsilon}{n}i_\square(r)$$

and the transmission of the n facets for the parameter values $r_u/r_o = 0.1; 0.2; 0.3; 0.4$ and $0.5$.

Figure 6:
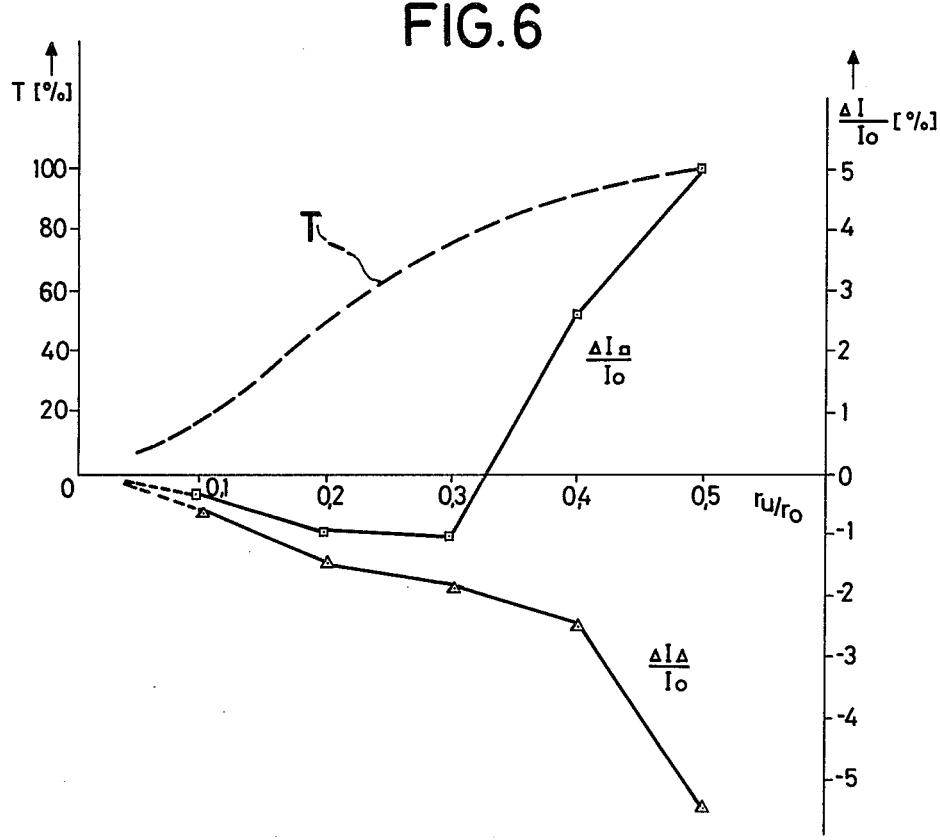
FIG. 6 illustrates graphs representative of the intensity deviation in the superimposed beam and for the transmission dependence upon the relationship of the facets circumferential radius with respect to the radius (of the beam of rays), in which the intensity has dropped off to 1/e.

Set forth in FIG. 6 are the deviations of $I_\Delta$ and $I_\epsilon$ relative to $I_o$, as well as transmission as a function of $r_u/r_o$. As one ascertains, through application of the faceted lens, for example, at 80% transmission there is achievable a total deviation of 2%, whereas by cutting off the marginal rays at the same transmission, the maximum deviation in the beam of rays would be 80%.

The production of the faceted lens can be achieved through grinding in different manners:

(a) Proceeding from a planoconvex lens of small aperture, which is retained in an arrangement pivotable about two intersecting axes, arranged mutually perpendicular and in the basic position being directed in parallel to the planar grinding disk, through suitable small adjusting angles and strokes of the arrangement perpendicular to the grinding disk there are ground facets into the spherical surface of the lens (squares).

(2) Proceeding from a planoconvex lens of small aperture, which is retained in an arrangement pivotable about an axis A1 directed in parallel to the planar grinding disk and is rotatable about an axis A2 perpendicular to the former, and in the basic position directed perpendicular to the grinding disk, through suitable small adjusting angles about A1 and adjusting angles in multiples of 60° about A2 and through strokes of the arrangement perpendicular to the grinding disk, there are ground facets into the spherical surface of the lens (hexagons).

The inventive intensity equalization is, above all, of interest wherein, for quantitative determination of optical interactions or effects, there is desired a simple reproduceable intensity distribution function, but which is not afforded by the optical source. A special example of this is formed in the laser diagnostic.

Figure 7:
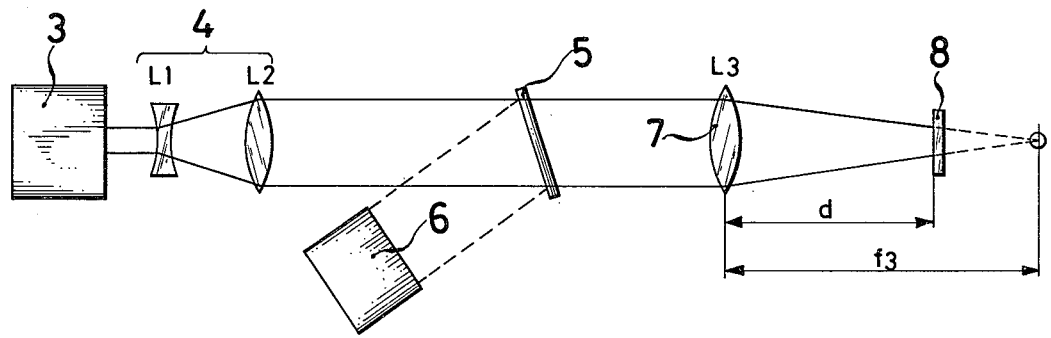
FIG. 7 is a schematic illustration of a physical application of the faceted lens.

FIG. 7 illustrates a schematic representation of the application of a faceted lens in an experiment for laser-induced thermal desorption.

The radiation emitted by a giant impulse-ruby laser 3 is conducted for beam expansion through the lenses 4, and after passage through the divider plate 5 (wherein approximately 4% is deviated towards the monitoring diode 6) and through a further lens 7 (designated with L3) reaches the target.

Through the setting of a target distance (from the lens L3) $d < f_3$, one can adjust the power density of the laser beam on the target. The density distribution and also the temperature distribution approximately have gauss profile. In the simplified desorption model, the desorption rate $$\frac{dN_D}{dt} \sim e^{-E_D/RT},$$

wherein $E_D$=the desorption energy and T=surface temperature of the target. There the relation of the desorption rates for $D_{D/RT}=10$ and $E_{D/RT}=20$ (in effect, at temperature doubling) is 20,000:1, in essence, the desorbed particles originate almost exclusively from the target surfaces with the doubled temperature. Under these conditions it is difficult to estimate the size of the desorbing surfaces, and to conclude the surface covering from the number of the desorbed particles. The mentioned difficulties can be eliminated through homogenization of the beam intensities and thereby the temperature distribution across the target. This can be accomplished by replacing the lens 3 by a faceted lens of suitable facet size with the focal distance $f_v=d$.

What is claimed is:

1. Arrangement for the illumination of a target surface wherein the light intensities at each point of this surface are uniform, including projecting a collimated beam of light with arbitrary local distribution of the light intensities towards said surface; comprising a light source for projecting a collimated beam of light; a target surface receiving said beam of light and being illuminated thereby; a generally planoconvex polyhedral lens interposed in the path of the light beam at a distance from the target surface to be illuminated corresponding to the focal distance of said lens, the planar surface of said planoconvex lens being oriented to extend perpendicular to the direction of said light beam, said lens having the convex polyhedral surface thereof composed of congruent plane surface elements.

2. Arrangement as claimed in claim 1, said surface elements being square in configuration.

3. Arrangement as claimed in claim 1, said surface elements being hexagonal in configuration.

4. Arranged being used in laser diagnostic arrangement being of particular use in laser diagnostic.

* * * * *

UNITED STATES PATENT OFFICE
CERTIFICATE OF CORRECTION

Patent No. 4,451,872  Dated June 28, 1984

Inventor(s) Heinz Hartwig

It is certified that error appears in the above-identified patent and that said Letters Patent are hereby corrected as shown below:

Column 4, line 45, "$I_A$ and $I_E$" should read --$I_A$ and $I_D$--.

Column 5, line 24, "have gauss" should read --have a gauss--.

Column 5, line 32, "$D_D/RT$" should read --$E_D/RT$--.

Signed and Sealed this

Twelfth Day of February 1985

[SEAL]

Attest:

DONALD J. QUIGG

Attesting Officer      Acting Commissioner of Patents and Trademarks